United States Patent [19]
Kanda

[11] Patent Number: 5,890,651
[45] Date of Patent: Apr. 6, 1999

[54] AIR CONDITIONING APPARATUS FOR VEHICLE

[75] Inventor: Hiromasa Kanda, Gamagori, Japan

[73] Assignee: Denso Corporation, Kariya, Japan

[21] Appl. No.: 63,734

[22] Filed: Apr. 21, 1998

[51] Int. Cl.[6] ....................................................... F24F 7/00
[52] U.S. Cl. ........................ 236/49.3; 454/121; 454/156
[58] Field of Search .............................. 236/49.3; 62/404, 62/407, 408; 165/44; 454/121, 126, 156

[56] References Cited

U.S. PATENT DOCUMENTS

| | | | |
|---|---|---|---|
| 5,181,553 | 1/1993 | Doi | 165/42 |
| 5,632,672 | 5/1997 | Higashihara | 454/126 |

FOREIGN PATENT DOCUMENTS

U-4-83811  7/1992  Japan .

*Primary Examiner*—John M. Sollecito
*Attorney, Agent, or Firm*—Harness, Dickey & Pierce PLC

[57] ABSTRACT

In an air conditioning apparatus for a vehicle, when a bi-level mode or a foot/defroster mode is set, a stop position of a second mode selecting door is shifted relative to a stop position of a first mode selecting door so that a pressure loss in a second air passage corresponds to a pressure loss in a first air passage. Therefore, in each air outlet mode, a ratio between an amount of air blown from the first air passage toward a driver's seat side in a passenger compartment and an amount of air blown from the second air passage toward a front passenger's seat side next to the driver's seat in the passenger compartment can be set at a predetermined value. Thus, air-conditioning feeling for a driver or a passenger in the passenger compartment can be improved while reducing production cost of the air conditioning apparatus.

9 Claims, 5 Drawing Sheets

AIR CONDITIONING APPARATUS FOR VEHICLE

BACKGROUND OF THE INVENTION

1. Field of the Invention

The present invention relates to an air conditioning apparatus for a vehicle, which can respectively independently adjust temperature of air blown toward a driver's seat side and air blown toward a passenger's seat side next to the driver's seat, or can be respectively independently adjust a temperature of air blown toward a front seat side and air blown toward a rear seat side in a passenger compartment.

2. Description of Related Art

Conventionally, in an air conditioning apparatus where a temperature of air blown toward a front seat side and a temperature of air blown toward a rear seat side in a passenger compartment are respectively independently controlled, a ratio between an amount of air blown toward the front seat side and an amount of air blown toward the rear seat side of the passenger compartment (hereinafter, the ratio is referred to as "air amount ratio") is set to a predetermined value in each air outlet mode such as a face mode, a bi-level mode, a foot mode, a foot/defroster mode and a defroster mode.

However, when the air amount ratio is set at a predetermined value in each of the face mode, the foot mode or the defroster mode, the air amount ratio in the bi-level mode and the face/defroster mode cannot be adjusted if air outlet doors are placed at the same positions and a pressure loss (i.e., air flow resistance) in an air passage for the front seat side is different from that in an air passage for the rear seat side. Alternatively, when the air amount ratio is set at a predetermined value in the bi-level mode or foot/defroster mode, the air amount ratio in the face mode, the foot mode or the defroster mode cannot be adjusted.

To overcome such a problem, an air conditioning apparatus for a vehicle is described in JP-U-4-83811. In the conventional air conditioning apparatus, air outlet ducts having front face and front foot outlets for blowing conditioned air toward the front seat side are connected to an air conditioning case, and air outlet ducts having rear face and rear foot outlets for blowing conditioned air toward the rear seat side are connected to the air conditioning case. When the bi-level mode is set at the front seat side in the passenger compartment, each of two kinds of plate-like doors is set at an intermediate position to open both the front face air outlet and the front foot air outlet. On the other hand, when the bi-level mode is set at the rear seat side in the passenger compartment, one kind of an air outlet door is set at an intermediate position to open both the rear face air outlet and the rear foot air outlet. In the conventional air conditioning apparatus, the plate-like air outlet doors have different shapes in the front seat side and the rear seat side, resulting in an increased production cost.

SUMMARY OF THE INVENTION

In view of the foregoing problems, it is an object of the present invention to provide an air conditioning apparatus for a vehicle, in which a ratio between an amount of air blown toward a first air conditioning space in a passenger compartment and an amount of air blown toward a second air conditioning space in the passenger compartment can set at a predetermined value in each air outlet mode without increasing a production cost.

According to the present invention, in an air conditioning apparatus for a vehicle, a second mode door is displaced relative to a first mode door in such a manner that a pressure loss in a second air passage corresponds to a pressure loss in a first air passage, after selecting an air outlet mode. Therefore, a ratio between an amount of air blown from the first air passage toward a first air conditioning space in a passenger compartment and an amount of air blown from the second air passage toward a second air conditioning space in the passenger compartment can be set at a predetermined value, and air-conditioning feeling for a passenger in a passenger compartment can be improved. Further, because the second mode door has a shape similar to that of the first mode door, only one type door can be used for the first mode door and the second mode door. Thus, the air conditioning apparatus is manufactured at low cost.

Preferably, the first mode door has a first mode door opening portion through which air in the first air passage flows, and is displaced in a direction approximately perpendicular to a flow direction of air flowing through the first mode door opening portion. Further, the second mode door has a second mode door opening portion through which air in the second air passage flows, and is displaced in a direction approximately perpendicular to a flow direction of air flowing through the second mode door opening portion. Thus, the first door and the second door can readily accurately control the amount of air from the first air passage and the amount of air from the second air passage to improve the air-conditioning feeling for the passenger in the passenger compartment.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

Figure 1:
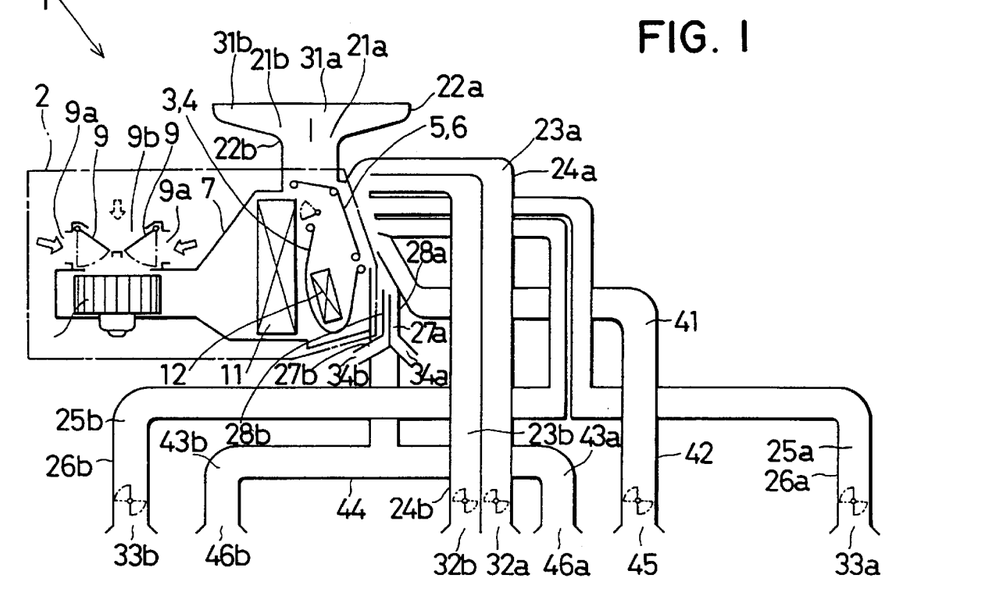
FIG. 1 is a schematic diagram showing an entire construction of a ventilation system of an air conditioning apparatus according to a preferred embodiment of the present invention.

As shown in FIG. 1, an air conditioning apparatus 1 for a vehicle includes: an air conditioning unit 2 for controlling a temperature of air blown toward a passenger compartment; a driver's seat side duct group (hereinafter referred to as "first duct group") for blowing air toward a driver's seat side that is a first air conditioning space in the passenger compartment; a front-passenger's seat side duct group (hereinafter referred to as "second duct group") for blowing air toward a front-passenger's seat side (i.e., a passenger's seat side next to the driver's seat) that is a second air conditioning space in the passenger compartment; a rear seat side duct group for blowing air toward a rear seat side in the passenger compartment; a first air mixing door 3 (i.e., driver's side air mixing door); a second air mixing door 4 (i.e., front-passenger's side air mixing door); a first mode selecting door 5 (i.e., driver's side air outlet selecting door); a second mode selecting door (i.e., front-passenger's side air outlet selecting door); and an air conditioning control unit for controlling the above-described equipments of the air conditioning apparatus 1.

Figure 2:
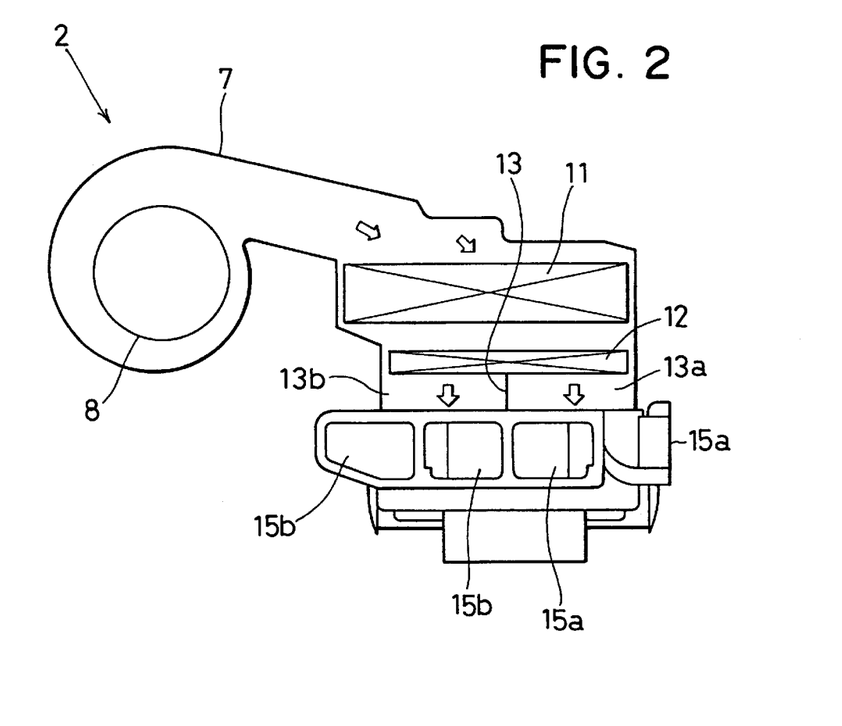
FIG. 2 is a schematic diagram showing an air conditioning unit of the air conditioning apparatus according to the embodiment.

In the air conditioning unit 2, a temperature of air blown toward the driver's seat side and a temperature of air blown toward the passenger's seat side next to the driver's seat can be respectively independently controlled. The air conditioning unit 2 includes a unit case 7 for forming an air passage through which air is blown toward the passenger compartment, and is disposed in the passenger compartment. A blower unit 8 and an inside/outside air switching unit are disposed at one end side of the unit case 7.

The blower unit 8 includes a centrifugal multi-blades fan for generating an air flow toward the passenger compartment. The inside/outside air switching unit includes an inside air suction port 9a for introducing air inside the passenger compartment (hereinafter referred to as "inside air), an outside air suction port 9b for introducing air outside the passenger compartment (hereinafter referred to as "outside air"), and an inside/outside air switching door 9 for opening and closing the suction ports 9a, 9b.

An evaporator 11 for cooling air passing therethrough is disposed in the unit case 7 at a downstream air side of the blower unit 7 to cross the whole area of the air passage in the unit case 7. A heater core 12 which heats air passing therethrough using cooling water of an engine is disposed in the unit case 7 at a downstream air side of the evaporator 11. A partition wall 13, for partitioning the air passage in the unit case 7 into a first air passage 13a and a second air passage 13b, is formed in the unit case 7 at a downstream air side of the heater core 12.

The first duct group includes: a first defroster duct 22a for forming therein a first defroster air passage 21a; a first center face duct 24a for forming therein a first center face air passage 23a; a first side face duct 26a for forming therein a first side face air passage 25a; and a first foot duct 28a for forming therein a first foot air passage. Those first ducts 22a, 24a, 26a, 28a are respectively connected to defroster, face and foot opening portions provided on the most downstream air side inner wall of the unit case 7.

Specifically, on a downstream air side of the first defroster duct 22a, there are opened a plurality of first defroster air outlets 31a for mainly blowing warm air toward an inner surface of a front windshield at the driver's seat side (i.e., a right side front windshield in the embodiment). On a downstream air side of the first center face duct 24a, a first center face air outlet 32a for mainly blowing cool air toward the head portion of the driver seated on the driver's seat in the passenger compartment is opened at a front center portion in the passenger compartment. On a downstream air side of the first side face duct 26a, a first side face air outlet 33a for mainly blowing cool air toward the head portion of the driver seated on the driver's seat in the passenger compartment is opened at a front side portion in the passenger compartment. Further, on a downstream air side of the first foot duct 28a, a first foot air outlet 34a for mainly blowing warm air toward the foot area of the driver seated on the driver's seat in the passenger compartment is opened.

The second duct group includes: a second defroster duct 22b for forming therein a second defroster air passage 21b; a second center face duct 24b for forming therein a second center face air passage 23b; a second side face duct 26b for forming therein a second side face air passage 25b; and a second foot duct 28b for forming therein a second foot air passage 27b. Those second ducts 22b, 24b, 26b, 28b are respectively connected to defroster, face and foot opening portions 14b–16b provided on the most downstream air side inner wall of the unit case 7.

Specifically, on a downstream air side of the second defroster duct 22b, there are opened a plurality of second defroster air outlets 31b for mainly blowing warm air toward an inner surface of a front windshield at the front passenger's seat side (i.e., a left side front windshield in the embodiment). On a downstream air side of the second center face duct 24b, a second center face air outlet 32b for mainly blowing cool air toward the head portion of the passenger seated on the front-passenger's seat next to the driver's seat in the passenger compartment is opened at a front center portion in the passenger compartment. On a downstream air side of the second side face duct 26b, a second side face air outlet 33b for mainly blowing cool air toward the head portion of the passenger seated on the front-passenger's seat in-the passenger compartment is opened at a front side portion in the passenger compartment. Further, on a downstream air side of the second foot duct 28b, a second foot air outlet 34b for mainly blowing warm air toward the foot area of the passenger seated on the front passenger's seat in the passenger compartment is opened.

The rear seat side duct group includes a rear seat side face duct 42 for forming therein a rear seat side face air passage 41, and a rear seat side foot duct 44 for forming therein rear seat side foot air passages 43a, 43b. Those rear ducts 42, 44 are respectively connected to rear seat side face and foot opening portions provided on the most downstream air side inner wall of the unit case 7. At a downstream air side of the rear seat side face duct 42, there is opened a rear seat side face air outlet 45 for mainly blowing cool air toward the head portion of a passenger seated on a rear seat in the passenger compartment. Further, at a downstream air side of the rear seat side foot duct 44, there are opened rear seat side foot air outlets 46a, 46b for blowing air toward the foot area of the passenger seated on left or right side rear seat in the passenger compartment.

Figure 3:
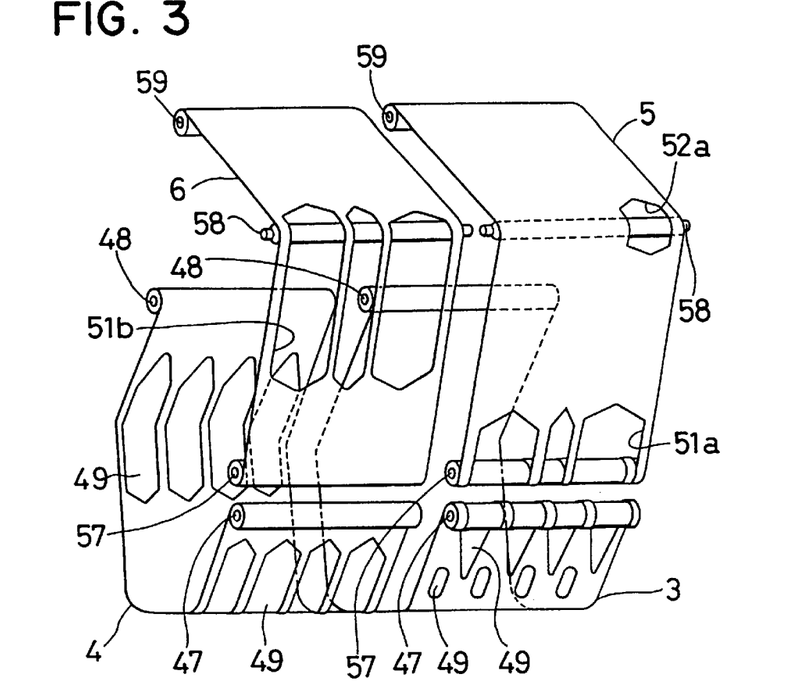
FIG. 3 is a perspective view showing first and second mode selecting doors and first and second air mixing doors of the air conditioning unit according to the embodiment.

As shown in FIGS. 1 and 3, each of the first and second air mixing doors 3, 4 is a film-like door (i.e., film door) for adjusting a ratio between an amount of air passing through the heater core 12 and an amount of air bypassing the heater core 12. The first and second air mixing doors 3 and 4 are moved between the shafts 47, 48, and have a plurality of opening portions 49. The first air mixing door 3 is disposed in the first air passage 13a of the unit case 7 at an upstream air side thereof, and the second air mixing door 4 is disposed in the second air passage 13b of the unit case 7 at an upstream air side thereof. A door driving unit such as an electric motor controlled by the air conditioning control unit is connected to the shaft 47 or the shaft 48.

The first mode selecting door 5 is a first film door for selecting at least an air outlet mode for the driver's seat side, and the second mode selecting door 6 is a second film door for selecting at least an air outlet mode for the front-passenger's seat side next to the driver's seat. The first and second mode selecting doors 5, 6 are moved between winding shafts 57, 59 and an intermediate shaft 58 which are rotatably held in the unit case 7. That is, each of the first and second mode selecting doors 5, 6 is formed to be moved along an inner surface of the unit case 7, in which the defroster, face and foot opening portions 14a–16a, 14b–16b are provided.

The first mode selecting door 5 has a plurality of door opening portions 51a–54a for opening an air outlet opening portion. When the door opening portions 51a–54a are communicated with any one opening portion of defroster, face and foot opening portions 14a–16a to form a first communication opening, air is blown toward the passenger compartment through the first communication opening.

The second mode selecting door 6 has a shape similar to the first mode selecting door 5. The second mode selecting door 6 has a plurality of door opening portions 51b–54b for opening an air outlet opening portion. When the door opening portions 51b–54b are communicated with any one opening portion of the defroster, face and foot opening portions 14b–16b to form a second communication opening, air is blown toward the passenger compartment through the second communication opening. The second mode selecting door 6 is used by turning back the first mode selecting door 5. The first mode selecting door 5 is disposed at a downstream air side of the first air passage 13a in the unit case 7, and the second mode selecting door 6 is disposed at a downstream air side of the second air passage 13b in the unit case 7. The winding shaft 57 or 59 is driven by a door driving unit such as an electric motor controlled by the air conditioning control unit.

In the embodiment, each of a first side air outlet mode (i.e., driver's seat side air outlet mode) and a second side air outlet mode (i.e., front-passenger's seat side air outlet mode) can be set to a face mode, a bi-level mode, a foot mode, a foot/defroster mode and a defroster mode. Because the first ducts 22a, 24a, 26a, 28a of the first side duct group have opening shapes, duct lengths and bending degrees which are different from that of the second ducts 22b, 24b, 26b, 28b of the second side duct group, pressure losses in each duct are different from each other. Therefore, in each of the face mode, the foot mode and the defroster mode, a ratio between the amount of air blown toward the driver's seat side and the amount of air blown toward the front-passenger's seat side next to the driver's seat can be set at a predetermined value (e.g., 60%:40%, 55%:45%, 50%:50%, 45%:55%, 40%:60%) by changing inner diameters, the lengths or bending degrees of the ducts. The ratio is different in each air outlet mode.

Next, an operation of the air conditioning apparatus 1 in each air outlet mode will be now described.

(1) FACE MODE

Figure 4:
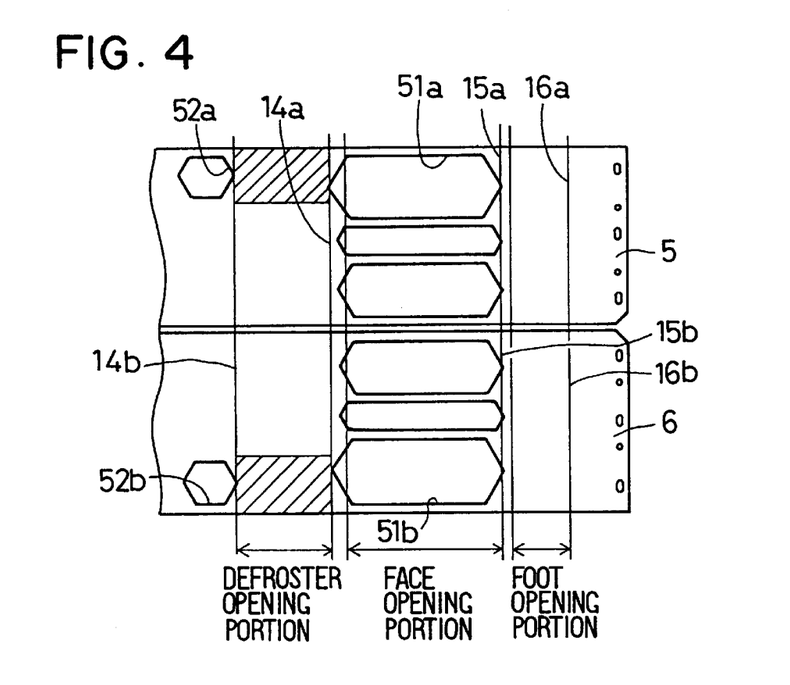
FIG. 4 is a development view showing stop positions of the first and second mode selecting doors in a face mode according to the embodiment.

When the face mode is selected according to signals from an air outlet mode selecting switch, a target blown-air temperature (TAO) and the like, the door driving unit is controlled by the air conditioning control unit so that the first and second mode selecting doors 5, 6 are wound around the shafts 59, respectively. In this case, as shown in FIG. 4, the defroster opening portions 14a, 14b and the foot opening portions 16a, 16b are closed by film portions of the first and second mode selecting doors 5, 6, and the center and side openings of the face opening portions 15a, 15b are opened by door opening portions 51a, 51b of the first and second mode selecting doors 5, 6.

The first air mixing door 3 is stopped at a position to adjust the temperature of air to be blown into the first side (i.e., the driver's side) in the passenger compartment. The conditioned air flows into the first center face air passage 23a and the first side face air passage 25a after passing through the first air passage 13a, the door opening portions 51a and the face opening portion 15a. Air introduced into the first center face air passage 23a and the first side face air passage 25a is blown toward the head portion of the driver seated on the driver's seat from the first center face air outlet 32a and the first side face air outlet 33a.

On the other hand, the second air mixing door 4 is stopped at a position to adjust the temperature of air to be blown into the second side (i.e., the front passenger's side next to the driver's side) in the passenger compartment. The conditioned air flows into the second center face air passage 23b and the second side face air passage 25b after passing through the second air passage 13b, the door opening portions 51b and the face opening portion 15b. Air introduced into the second center face air passage 23b and the second side face air passage 25b is blown toward the head portion of the passenger seated on the front passenger's seat from the second center face air outlet 32b and the second side face air outlet 33b.

(2) BI-LEVEL MODE

Figure 5:
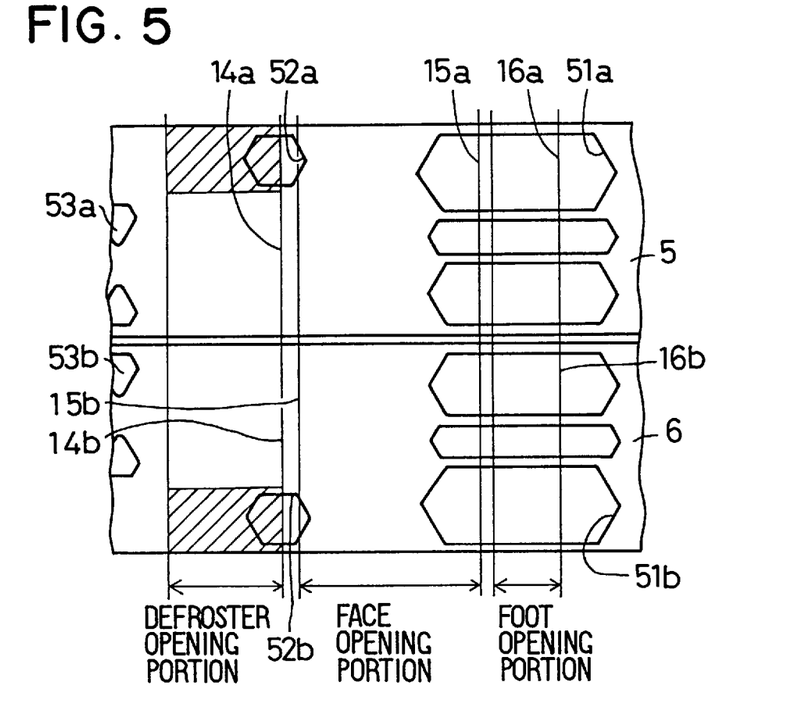
FIG. 5 is a development view showing stop positions of the first and second mode selecting doors in a bi-level mode according to the embodiment.

In the bi-level mode, as shown in FIG. 5, the defroster opening portions 14a, 14b are closed by the film portions of the first and second mode selecting doors 5, 6, and the center and side openings of the face opening portions 15a, 15b and the foot opening portions 16a, 16b are opened by the door opening portions 51a, 51b, 52a, 52b. In the bi-level mode, because the pressure loss in the first ducts 24a, 26a, 28a is smaller than that in the second ducts 24b, 26b, 28b, a predetermined air amount ratio between the driver's seat side and the front-passenger's seat side in the passenger compartment cannot be obtained. In this case, the second mode selecting door 6 is placed at a solid line position shown in FIG. 6, and the first mode selecting door 5 is shifted (displaced) from the solid line position to stop at a chain line position shown in FIG. 6 so that the opening area of the first face opening portion 15a becomes smaller than that of the second face opening portion 15b. Because the first mode selecting door 5 is shifted (displaced) to the chain line position shown in FIG. 6, the pressure in the first center face air passage 23a of the first center face duct 24a becomes larger as compared with a case where the first mode selecting door 5 is stopped at the solid line position. Thus, the pressure loss in the first center face air passage 23a is approximately equal to that in the second center face air passage 23b, the ratio between the amount of air blown toward the driver's side and the amount of air blown toward the front passenger's side next to the driver's seat can be set at a predetermined value.

Figure 6:
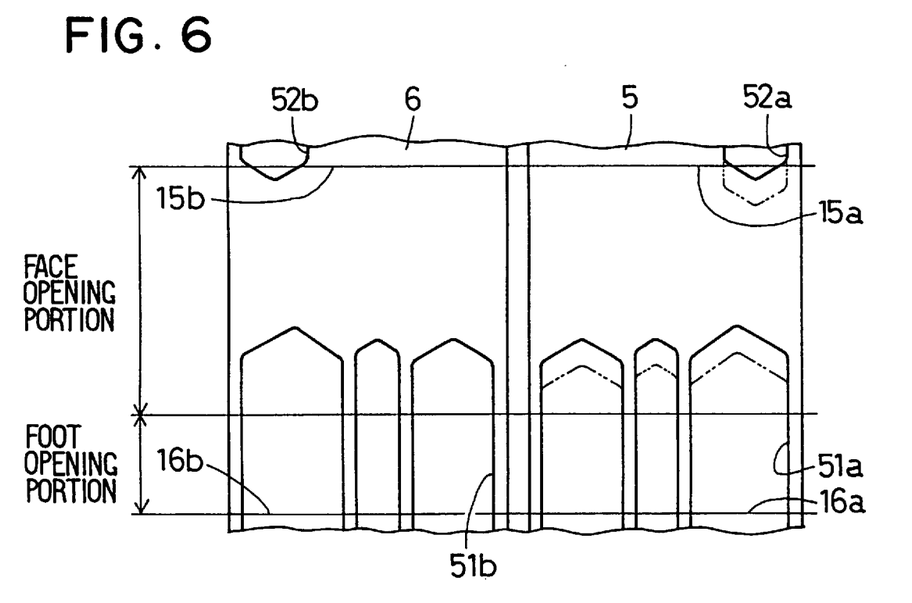
FIG. 6 is a partly enlarged view showing the stop positions of the first and second mode selecting doors in the bi-level mode according to the embodiment.

In the bi-level mode, air flowing in the first air passage 13a of the unit case 7 is blown toward the head portion of the driver seated on the driver's seat from the first center face air outlet 32a and the first side face air outlet 33a, and is blown toward the foot portion of the driver seated on the driver's seat from the first foot air outlet 34a. On the other hand, air flowing in the second air passage 13b of the unit case 7 is blown toward both of the head portion of the passenger seated on the front passenger's seat from the second center face air outlet 32b and the second side face air outlet 33b and the foot portion of the passenger seated on the front passenger's seat from the second foot air outlet 34b.

(3) FOOT MODE

Figure 7:
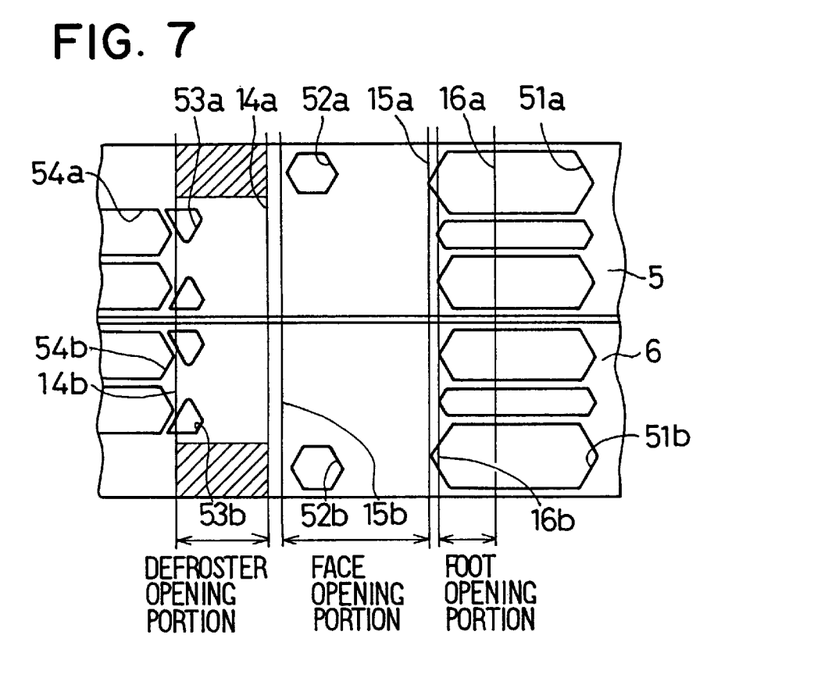
FIG. 7 is a development view showing stop positions of the first and second mode selecting doors in a foot mode according to the embodiment.

In the foot mode, as shown in FIG. 7, the center openings of the face opening portions 15a, 15b are closed by the film portions of the first and second mode selecting doors 5, 6, the defroster opening portions 14a, 14b, the side openings of the face opening portions 15a, 15b and the foot openings 16a, 16b are opened by the door opening portions 51a–53a, 51b–53b of the first and second mode selecting doors 5, 6. Therefore, air flowing in the first air passage 13a of the unit case 7 is blown toward the inner surface of the front windshield at the driver's side from the first defroster air outlet 31a. Further, air in the first air passage 13a is blown toward the head portion of the driver and the inner surface of the side windshield from the first side face air outlet 33a, and is blown toward the foot area of the driver from the first foot air outlet 34a. On the other hand, air flowing in the second air passage 13b of the unit case 7 is blown toward the inner surface of the front windshield at the front passenger's side from the second defroster air outlet 31b. Further, air in the second air passage 13b is blown toward the head portion of the front passenger and the inner surface of the side windshield from the second side face air outlet 33b, and is blown toward the foot area of the front passenger from the second foot air outlet 34b.

(4) FOOT/DEFROSTER MODE

Figure 8:
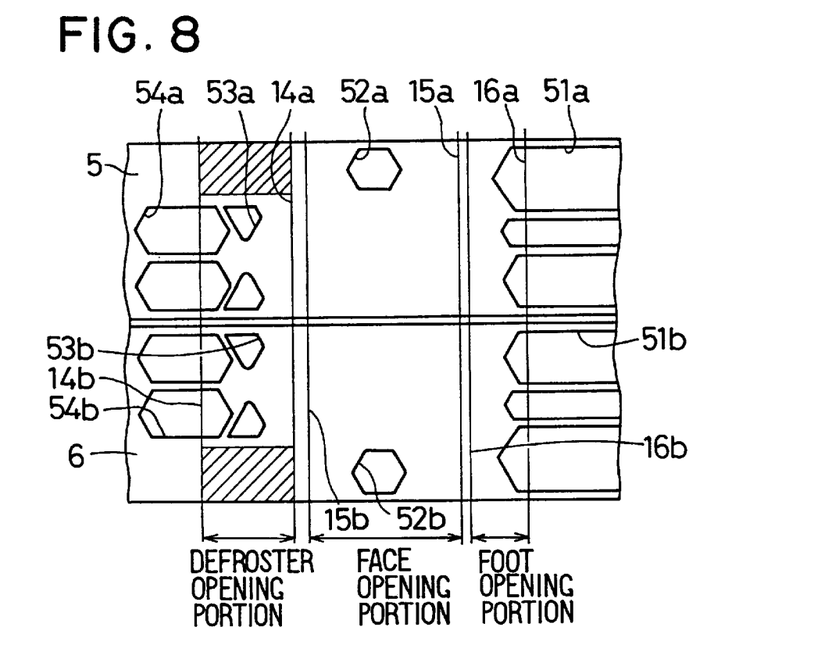
FIG. 8 is a development view showing stop positions of the first and second mode selecting doors in a foot/defroster mode according to the embodiment.

In the foot/defroster mode, as shown in FIG. 8, center openings of the face opening portions 15a, 15b are closed by the film portions of the first and second mode selecting doors 5, 6, the defroster opening portions 14a, 14b, the side openings of the face opening portions 15a, 15b and the foot openings 16a, 16b are opened by the door opening portions 51a–54a, 51b–54b of the first and second mode selecting doors 5, 6.

According to the embodiment, in the foot/defroster mode, because the pressure loss in the first ducts 22a, 26a, 28a is smaller than that in the second ducts 22b, 26b, 28b, a predetermined air amount ratio between the driver's seat side (first side) and the front passenger's seat side (second side) in the passenger compartment cannot be obtained. In this case, the first mode selecting door 5 is placed at a solid line position shown in FIG. 9, and the second mode selecting door 6 is shifted from the solid line position to stop at a chain line position shown in FIG. 9. Therefore, the opening area of the first defroster opening portion 14a becomes larger than that of the second defroster opening portion 14b, and the opening area of the first foot opening portion 16a becomes smaller than that of the second foot opening portion 16b.

Figure 9:
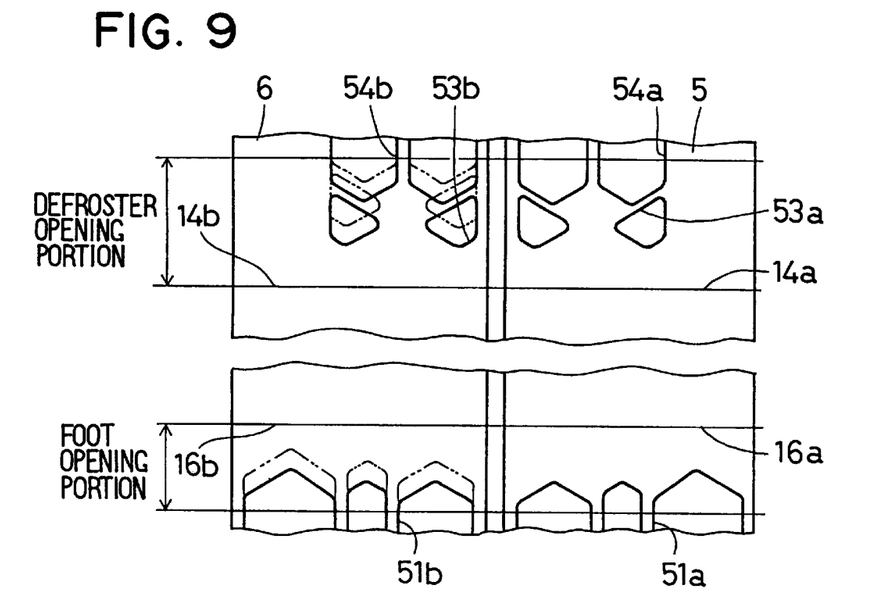
FIG. 9 is a partly enlarged view showing the stop positions of the first and second mode selecting doors in the foot/defroster mode according to the embodiment.

Because the second mode selecting door 6 is shifted to the chain line position shown in FIG. 9, the pressure loss in the second defroster air passage 21b of the second defroster duct 22b becomes larger as compared with a case where the second mode selecting door 6 is stopped at the solid line position, and the pressure loss in the second foot air passage 27b of the second foot air duct 28b becomes smaller as compared with a case where the second mode selecting door 6 is stopped at the solid line position. Thus, the pressure loss in the second defroster air passage 21b becomes larger to be approximately equal to that in the first defroster air passage 21, and the pressure loss in the second foot air passage 27b becomes smaller to be approximately equal to that in the first foot air passage 27a. As a result, in the foot/defroster mode, the ratio between the amount of air blown toward the driver's side and the amount of air blown toward the front passenger's side next to the driver's seat can be set at a predetermined value.

Air passing through the first air passage 13a in the unit case 7 is blown toward the inner surface of the front windshield at the driver's side from the first defroster air outlet 31a, is blown toward the head portion of the driver and the inner surface of the side windshield from the first side face air outlet 33a, and is blown toward the foot area of the driver from the first foot air outlet 34a. On the other hand, air passing through the second air passage 13b is blown toward the inner surface of the front windshield at the front passenger's side from the second defroster air outlet 31b, is blown toward the head portion of the front passenger and the inner surface of the side windshield from the second side face air outlet 33b, and is blown toward the foot area of the front passenger from the second foot air outlet 34b.

(5) DEFROSTER MODE

Figure 10:
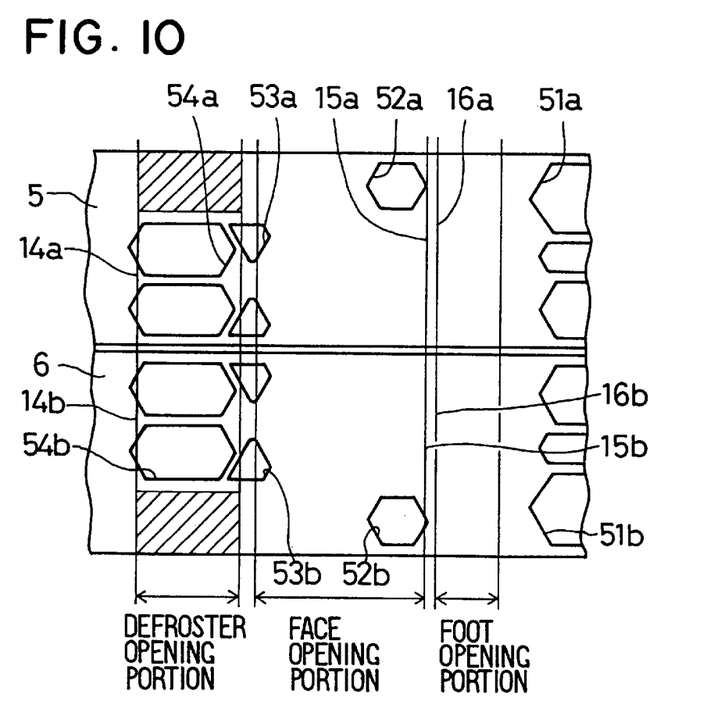
FIG. 10 a development view showing stop positions of the first and second mode selecting doors in a defroster mode according to the embodiment.

In the defroster mode, as shown in FIG. 10, the foot opening portions 16a, 16b and the center openings of the face opening portions 15a, 15b are closed by the film portions of the first and second mode selecting doors 5, 6, and the defroster opening portion 14a, 14b and the side openings of the face opening portions 15a, 15b are opened by the door opening portions 52a–54a, 52b–54b of the first and second mode selecting doors 5, 6. Thus, air passing through the first air passage 13a of the unit case 7 is blown toward the inner surface of the front windshield at the driver's side from the first defroster air outlet 31a, and is blown toward the head portion of the driver and the inner surface of the side windshield from the first side face air outlet 33a. On the other hand, air passing through the second air passage 13b of the unit case 7 is blown toward the inner surface of the front windshield at the front passenger's side from the second defroster air outlet 31b, and is blown toward the head portion of the front passenger and the inner surface of the side windshield from the second side face air outlet 33b.

According to the above-described embodiment, in the air conditioning apparatus 1 where the ratio between the amount of air blown toward-the driver's seat side and the amount of air blown toward the front passenger's seat side next to the driver's seat is set at a predetermined ratio during the face mode, the foot mode and the defroster mode, the stopped position of the second mode selecting door 6 is shifted relative to the stopped position of the first mode selecting door 5 in accordance with the pressure loss (air flow resistance) in the first duct and the pressure loss in the second duct during the foot/defroster mode and the bi-level mode, as shown in FIGS. 6 and 9. Thus, in the bi-level mode and the foot/defroster mode, a predetermined air amount ratio between the driver's seat side and the front passenger's seat side can be set.

Even in the air conditioning apparatus having only the single blower unit 8, the temperature of air blown toward the driver's seat side and the temperature of air blown toward the front passenger's seat side next to the driver's seat can be respectively independently controlled, and the amount of blown-air is not changed by selecting an air outlet mode. Thus, the air-conditioning feeling for the driver and the passenger in the passenger compartment can be improved.

Further, because the first and second mode selecting doors 5, 6 have the same shape and the second mode selecting door 6 is used by turning back the first mode selecting door 5, only one type of the film-like door is used for switching a first air outlet mode (i.e., the driver's side air outlet mode)

and a second air outlet mode (i.e., the front passenger's side air outlet mode). Thus, the air conditioning apparatus 1 can be manufactured at a low cost.

Although the present invention has been fully described in connection with the preferred embodiment thereof with reference to the accompanying drawings, it is to be noted that various changes and modifications will become apparent to those skilled in the art.

For example, in the above-described embodiment, the first mode selecting door 5 is used for selecting the driver's side air outlet mode, and the second mode selecting door 6 is used for selecting the front passenger's side air outlet mode. However, the first mode selecting door 5 may be used for selecting a front seat side air outlet mode, and the second mode selecting door 6 may be used for selecting a rear seat side air outlet mode.

In the above-described embodiment, during the bi-level mode or the foot/defroster mode, the stopped position of the second mode selecting door 6 is shifted relative to the stopped position of the first mode selecting door 5. However, during the face mode, the foot mode or the defroster mode, the stopped position of the second mode selecting door 6 may be shifted relative to the stopped position of the first mode selecting door 5. Further, in a face/defroster mode, the stopped position of the second mode selecting door 6 may be shifted relative to the stopped position of the first mode selecting door 5.

In the above-described embodiment, the film-like doors are used as the first and second mode selecting doors 5, 6. However, as the first and second mode selecting doors 5, 6, a single plate-like door or a plurality of plate-like doors may be used. In the above-described embodiment, the first and second mode selecting doors 5, 6 are driven by the door driving unit such as an electric motor. However, the first and second mode selecting doors 5, 6 may be driven a manual operation unit such as an air outlet selecting lever through a link mechanism.

Such changes and modifications are to be understood as being within the scope of the present invention as defined by the appended claims.

What is claimed is:

1. An air conditioning apparatus for a vehicle having a passenger compartment which has a first air conditioning space and a second air conditioning space, said air conditioning apparatus comprising:

a case for forming an air passage;

a partition member for partitioning said air passage into a first air passage for blowing air toward said first air conditioning space and a second air passage for blowing air toward said second air conditioning space;

a blower unit for blowing air toward the passenger compartment through said first air passage and said second air passage;

a temperature controlling unit to independently control a temperature of air blown toward said first air conditioning space and a temperature of air blown toward said second air conditioning space;

a first mode door for selecting an air outlet mode which sets an air-blowing position of said first air conditioning space, and for changing an opening degree of said first air passage;

a second mode door for selecting an air outlet mode which sets an air-blowing position of said second air conditioning space, and for changing an opening degree of said second air passage, said second mode door having a shape similar to that of said first mode door, wherein:

said second mode door is displaced relative to said first mode door in such a manner that a pressure loss in said second air passage corresponds to a pressure loss in said first air passage, after selecting the air outlet mode.

2. The air conditioning apparatus according to claim 1, wherein:

said first mode door has a first mode door opening portion through which air in said first air passage flows, and is displaced in a direction approximately perpendicular to a flow direction of air flowing through said first mode door opening portion; and said second mode door has a second mode door opening portion through which air in said second air passage flows, and is displaced in a direction approximately perpendicular to a flow direction of air flowing through said second mode door opening portion.

3. The air conditioning apparatus according to claim 1, wherein:

said case includes a first upper opening portion for blowing air in said first air passage toward an upper side of said first air conditioning space in the passenger compartment, a first lower opening portion for blowing air in said first air passage toward a lower side of said first air conditioning space in the passenger compartment, a second upper opening portion for blowing air in said second air passage toward an upper side of said second air conditioning space in the passenger compartment, and a second lower opening portion for blowing air in said second air passage toward a lower side of said second air conditioning space in the passenger compartment;

said first mode door adjusts each opening area of said first upper opening portion and said first lower opening portion; and said second mode door adjusts each opening area of said second upper opening portion and said second lower opening portion.

4. The air conditioning apparatus according to claim 3, wherein:

said second mode door is set at the same position as said first mode door, when said first mode door opens said first upper opening portion and closes said first lower opening portion, and said second mode door opens said second upper opening portion and closes said second lower opening portion; and said second mode door is displaced relative to said first mode door, when said first mode door opens both of said first upper opening portion and said first lower opening portion, and said second mode door opens both of said second upper opening portion and said second lower opening portion.

5. The air conditioning apparatus according to claim 3, wherein:

said second mode door is set at the same position as said first mode door, when said first mode door closes said first upper opening portion and opens said first lower opening portion, and said second mode door closes said second upper opening portion and opens said second lower opening portion; and said second mode door is displaced relative to said first mode door, when said first mode door opens both of said first upper opening portion and said first lower opening portion, and said second mode door opens both of said second upper opening portion and said second lower opening portion.

6. The air conditioning apparatus according to claim 3, wherein:
   said first mode door slides along an inner surface of said case to open and close said first upper opening portion and said first lower opening portion; and
   said second mode door slides along an inner surface of said case to open and close said second upper opening portion and said second lower opening portion.

7. The air conditioning apparatus according to claim 1, wherein said second mode door is displaced relative to said first mode door in such a manner that the pressure loss is approximately equal to the pressure loss in said second air passage.

8. An air conditioning apparatus for a vehicle having a passenger compartment which has a first air conditioning space and a second air conditioning space, said air conditioning apparatus comprising:
   a case for forming an air passage;
   a partition member for partitioning said air passage into a first air passage for blowing air toward said first air conditioning space and a second air passage for blowing air toward said second air conditioning space;
   a blower unit for blowing air toward the passenger compartment through said first air passage and said second air passage;
   a temperature controlling unit to independently control a temperature of air blown toward said first air conditioning space and a temperature of air blown toward said second air conditioning space;
   a first mode door for selecting an air outlet mode which sets an air-blowing position of said first air conditioning space, and for changing an opening degree of said first air passage;
   a second mode door for selecting an air outlet mode which sets an air-blowing position of said second air conditioning space, and for changing an opening degree of said second air passage, said second mode door having a shape similar to that of said first mode door; and
   pressure loss correcting means for correcting a pressure loss in said second air passage to correspond to a pressure loss in said second air passage, after selecting the air outlet mode.

9. The air conditioning apparatus according to claim 8, wherein said second mode door is displaced relative to said first mode door to correct the pressure loss in said second air passage to be approximately equal to the pressure loss in said first air passage.

* * * * *

UNITED STATES PATENT AND TRADEMARK OFFICE
CERTIFICATE OF CORRECTION

PATENT NO. : 5,890,651
DATED : April 6, 1999
INVENTOR(S) : Hiromasa Kanda

It is certified that error appears in the above-identified patent and that said Letters Patent is hereby corrected as shown below:

Col. 1, line 10, delete "be";

Col. 1, line 63, after "can" insert --be--

Col. 3, line 24, delete "equipments" and insert --equipment--

Col. 3, line 41, delete "air)" and insert --air")--

Col. 3, line 47, delete "blower unit 7" and insert --blower unit 8--

Col. 4, line 58, after "on" insert --the--

Col. 9, line 35, after "driven" insert --by--

Col. 9, line 55, claim 1, delete "controlling unit to independently control" and insert --control unit for independently controlling--

Col. 12, line 1, claim 8, delete "controlling unit to independently control" and insert --control unit for independently controlling--.

Signed and Sealed this

Twenty-eighth Day of September, 1999

Attest:

Q. TODD DICKINSON

*Attesting Officer*   *Acting Commissioner of Patents and Trademarks*